United States Patent [19]
English et al.

[11] 3,949,822
[45] Apr. 13, 1976

[54] VEHICLE WHEEL WEIGHING SYSTEM

[75] Inventors: David C. English, Seattle; Godfrey A. Holmstrom, Issaquah, both of Wash.

[73] Assignee: Jerry L. McCauley, Tukwila, Wash.

[22] Filed: Sept. 30, 1974

[21] Appl. No.: 510,698

[52] U.S. Cl. .............................. 177/126; 177/211
[51] Int. Cl.² ...................... G01G 21/00; G01G 3/14
[58] Field of Search ........... 177/126, 211; 73/141 A

[56] References Cited
UNITED STATES PATENTS 3,439,761 4/1969 Laimins ............................ 177/211

*Primary Examiner*—George H. Miller, Jr.
*Attorney, Agent, or Firm*—Seed, Berry, Vernon & Baynham

[57] ABSTRACT

A weight sensing pad includes two spaced apart load cells, each including a fixed end bending beam deflectable by vertical loads applied to the pad by the wheel of a vehicle and electrical strain gages for sensing beam deflection. The pad includes electronic control circuitry connecting the strain gages in a wheatstone bridge circuit, and providing calibration, zero, output, and bridge sensitivity adjustments. Two or more pads can be serially interconnected electrically with a remote electronic weight indicator.

12 Claims, 6 Drawing Figures

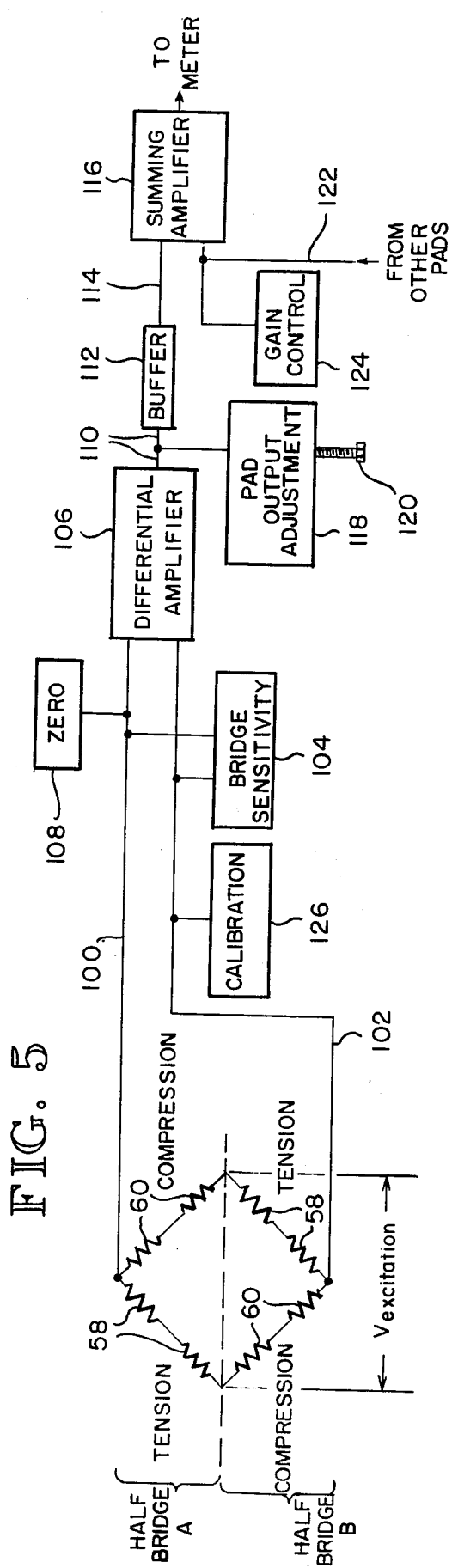

VEHICLE WHEEL WEIGHING SYSTEM

BACKGROUND OF THE INVENTION

This invention relates to weighing systems for sensing the weight of large objects and, more particularly, for sensing the weight of wheeled vehicles such as trucks trailers and the like.

To maximize profits, operators of large vehicles, especially vehicles hauling heavy loads on weight-regulated highways, load their vehicles to the legal limit; and, hence, frequently risk being fined for excessive weight when they load their vehicles at locations remote from a weighing station. To enable operators of such vehicles to weigh their vehicles at remote locations without using large platform scales, onboard vehicle weighing systems have been proposed, principally as applied to logging trucks; however, these on-board vehicle weighing systems often are used ineffectively because they can be used to weigh the particular vehicle on which they are installed, or are uneconomical due to installation, retrofit, operating costs, etc.

SUMMARY OF THE INVENTION

This invention provides a portable self-contained vehicle weighing system suitable for use independently of a particular vehicle with minimum or no retrofit and installation requirements. The weighing system includes one or more weight sensing pads positionable on the ground underneath selected wheels of the vehicle for sensing the weight of the vehicle or the load applied by a selected group of wheels. Each pad is made up of one or more highly sensitive load cells each comprising a fixed end bending beam and strain sensors providing accurate information indicative of applied load. Inasmuch as the pads include no moving parts to shift or slide relatively, there are no moving parts likely to wear out and, hence, the pads are extremely reliable and economical in operation.

In a preferred embodiment of the weight sensing pad of this invention, vertical load transmitted by one wheel of the vehicle is applied to two spaced apart bending beam load cells respectively including two parallel elongated fixed end bending beams, the mid-sections of which are deflectable downwardly upon application of a downward load thereto, and strain sensors responsive to deflection of the bending beam mid-sections providing information indicative of the applied loads. Preferably the bending beams are interconnected and deflected downwardly substantially simultaneously.

The strain sensors include electrical strain gages connected in a wheatstone bridge circuit. The bridge circuit, together with additional electronic control circuitry, is included in the pad. The control circuitry includes amplifier means for amplifying signals from the pad bridge circuit and for receiving and summing signals from one or more additional serially interconnected pads to provide a summed output signal representing the load applied to that pad and to such additional pads. The output from the last pad in the series is transmitted to a remote electronic weight indicator. The pad control circuitry also provides calibration, zero, output, and bridge sensitivity adjustments. The bridge sensitivity adjustment may be used to trim the pad output sensitivity from end to end.

These and other objects, features and advantages of the present invention will become apparent from the detailed description and claims to follow taken in conjunction with the accompanying drawings in which like parts bear like reference numerals.

BRIEF DESCRIPTION OF THE DRAWINGS

FIG. 5 is a circuit diagram of the electronic circuit of this invention;

FIG. 6 is a schematic diagram depicting a typical vehicle wheel weighing system using four serially interconnected weight sensing pads of FIG. 1.

DETAILED DESCRIPTION OF THE PREFERRED EMBODIMENT

Figure 1:
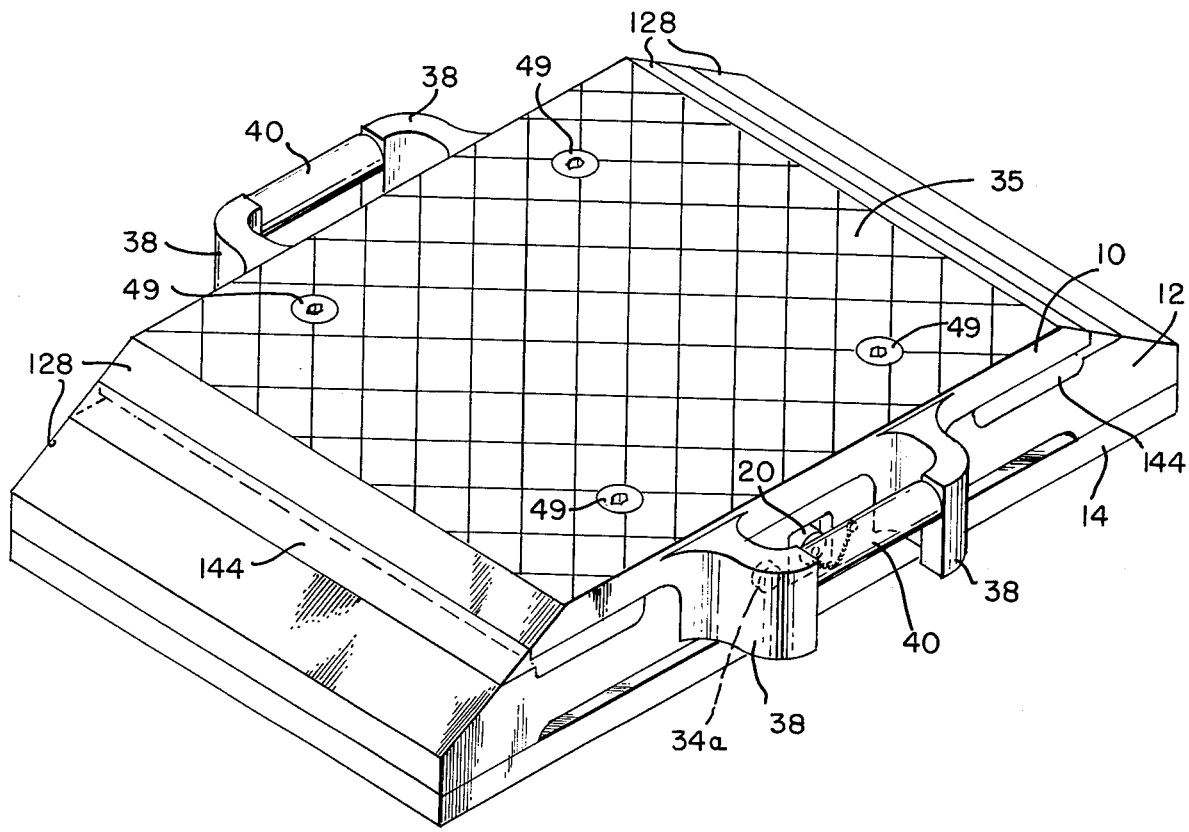
FIG. 1 is a top perspective view of a weight sensing pad accordingly to the present invention.

The vehicle weight system of the present invention comprises one or more weight sensing pads positionable on the ground underneath the wheels of the vehicle being weighed for providing information indicative of load applied to the pads by the vehicle wheels. The pads may be used individually or in combination to sense the weight of the entire vehicle or portions thereof. As depicted in FIG. 6, for example, four pads 2, 4, 6, and 8 may be used to sense the weight of a tractor-trailer vehicle and provide information to a conventional weight indicator 9 mounted in the vehicle or in a portable housing. In this example, the pads are positioned underneath the four outboard wheels of the double axle trailer rear wheel group. The pads are of sufficient thickness that when placed underneath these trailer wheels on firm group they elevate the four inboard wheels of the trailer rear wheel group. Thus, the full weight of the rear portion of the trailer is applied to and sensed by the pads 2, 4, 6, and 8 such that the operator can determine the weight of the rear portion of the trailer or the load applied by the trailer rear wheel group. Two pads, of course, may be used to sense the weight of the rear portion of the trailer or load applied by the trailer rear wheel group. In this case, the outboard wheels of the front and then the rear axle of the trailer rear wheel group are positioned on the two pads and separate readings are taken for each. These readings thereafter are added together to obtain the same readings obtained using four pads. The same four pads, of course, may be used to sense the total weight of the tractor-trailer vehicle when used in combination with an on-board tractor weighing system, or by positioning the pads underneath the tractor rear wheels, then underneath the trailer front wheels and adding together the readings obtained in these positions with those obtained from the trailer rear wheel group.

The pads of FIG. 6 are interconnected serially by electrical leads 2A, 4A, 6A, and 8A, the last of which leads to the weight indicator 9. The indicator includes an electrical power source providing power to the pads over leads 2A, 4A, 6A, and 8A. The pads each include generally similar control circuits providing electrical signals proportional to load applied by the vehicle wheels to the pads. These signals are transmitted to the weight indicator 9 over leads 2A, 4A, 6A, and 8A. When a plurality of pads are interconnected serially, the control circuit of each pad in the series receives and sums the signals from the preceeding pad or pads in the series with its own signals such that the output from the last pad in the series represents total load applied to all the interconnected pads.

The weight sensing pad of this invention has a rectangular outline and a generally flat profile. As most clearly shown in FIGS. 3 and 4, the pad comprises three superimposedly interengaged plate-like members; a top member 10, an intermediate platform member 12, and a bottom member 14. The platform member 12 provides two mutually parallel spaced apart bending beam type load cells 16 and 18 (FIG. 3) adjacent the longitudinal edge portions of the pad. Each load cell comprises an elongated fixed end bending beam and strain sensors providing electrical signals indicative of applied load to control circuitry formed on two superimposed printed circuit boards 19a and 19b (FIG. 4) nestled within the underside of the platform member. The upper of these printed circuit boards 19a basically provides electrical interconnections with control circuitry on the lower printed circuit board 19b.

Figure 2:
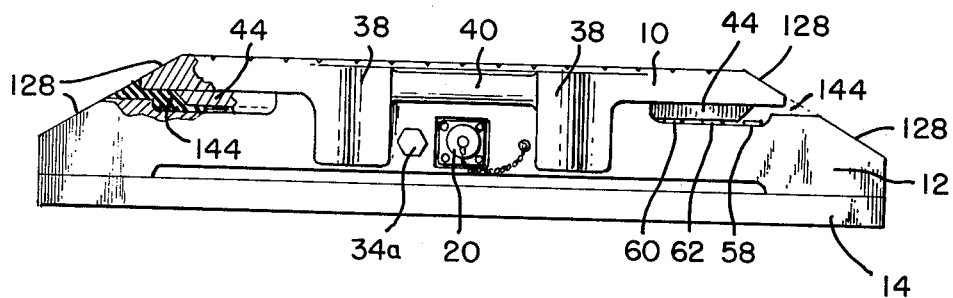
FIG. 2 is a side view of the weight sensing pad of FIG. 1.
Figure 3:
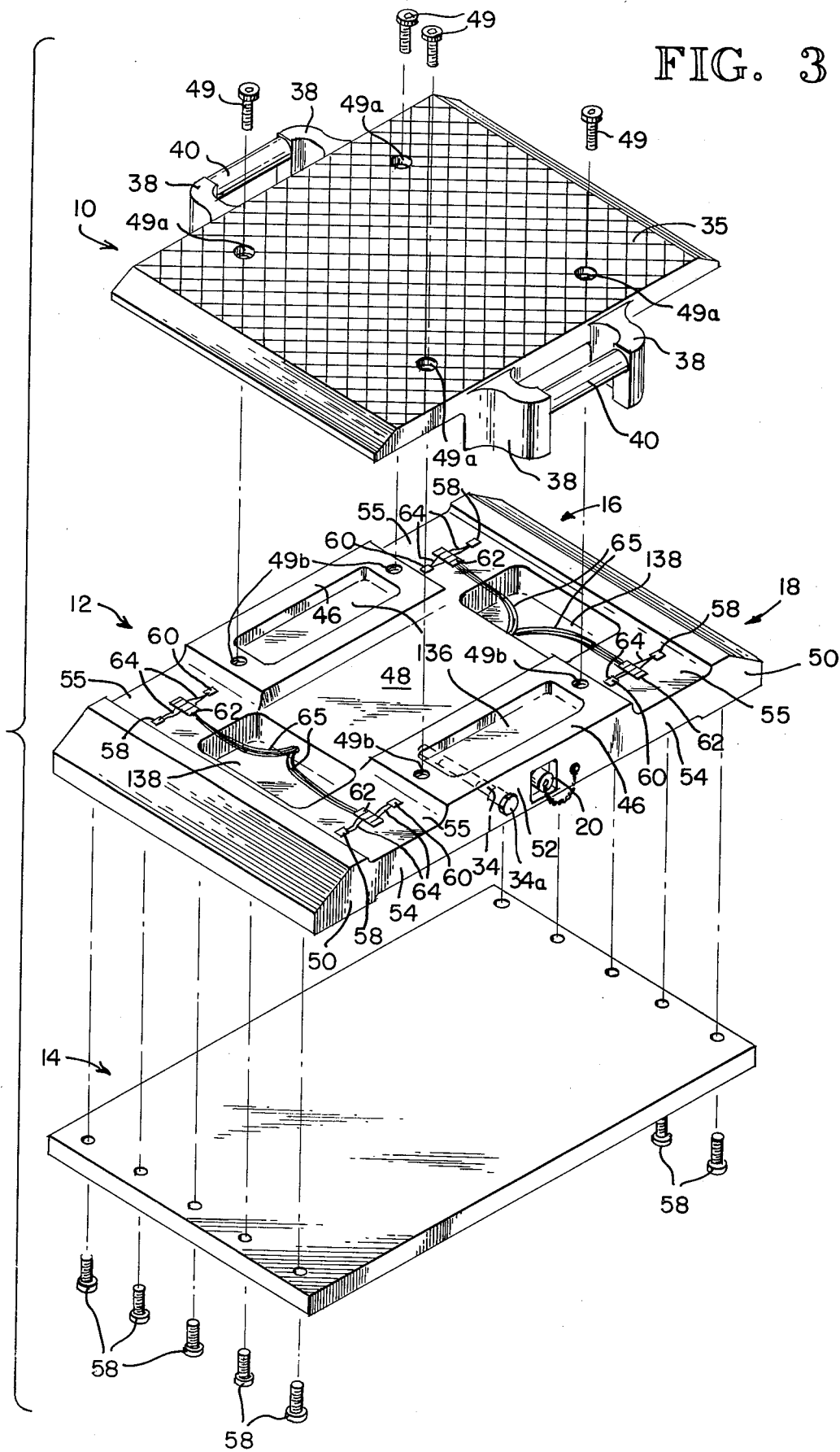
FIG. 3 is a top perspective view of the weight sensing pad of FIG. 1 partially disassembled.
Figure 4:
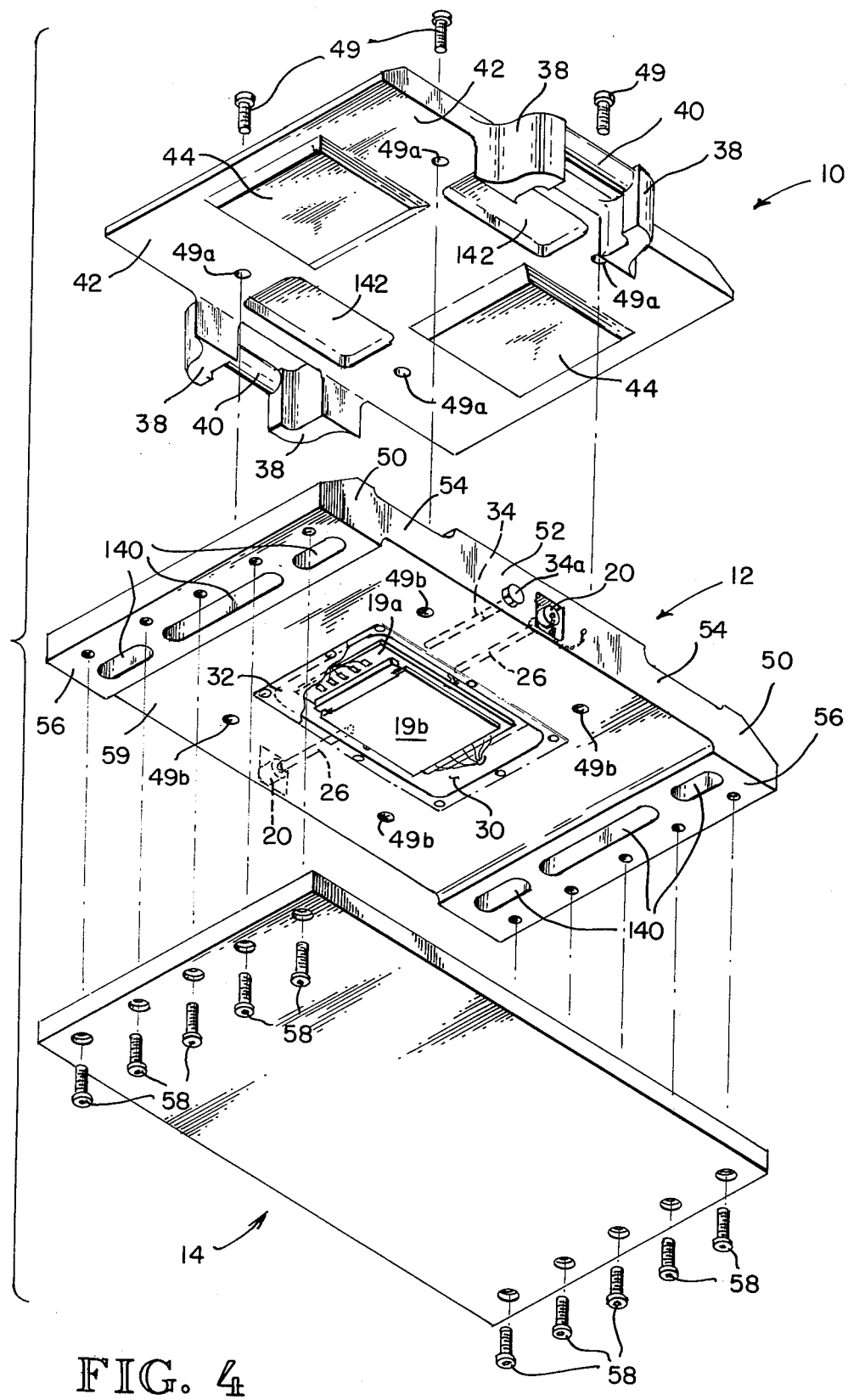
FIG. 4 is a bottom perspective view generally similar to FIG. 3.

The electrical leads of FIG. 6 are connected with electrical terminal connectors 20 (FIGS. 1–3) recessed within midportions of the platform member sides: one terminal connector being associated with the input lead from a proceeding pad and the other connector being associated with the output lead to the next pad in the series, or to the weight indicator 9. These terminal connectors and the upper printed circuit board 19a are interconnected by electrical leads (not shown) extending through tubular passges 26 in the platform member 12. As best shown in FIG. 4, both printed circuit boards are nestled within a rectangular cavity 30 in the bottom of the platform member 12. A cover 32 may be provided to seal closed the open end of this cavity. A third tubular passage 34 adjacent one lead passage 26 may be formed in the platform member to provide access to selected components of the control circuitry of the lower printed circuit board 19b. The outer end of this passage may be sealed closed by a cover 34a (FIG. 2).

The top member 10 includes a planar upper surface 35 against which the load of the vehicle wheel is applied. This surface may be roughened by serrations or cross hatching, as shown FIGS. 1 and 3), to provide positive engagement with the vehicle wheel. A pair of generally U-shaped handles project transversely outwardly from each side of the top member 10. These handles include generally S-shaped end portions 38 between which extend round hand grips 40. The electrical leads of FIG. 6 extend underneath the hand grips 40 between the handle end portions 38 when they are connected with the terminal connectors 20. These leads are protected by the handles against bending and dislodgement from terminal connectors 20 during use. As most clearly shown in FIG. 4, the underside of the top member 10 includes two transversely spaced apart, planar load bearing surfaces 42 adjacent the longitudinal edges of the top member 10. Generally square, longitudinally spaced bosses 44 formed adjacent the ends of the top member between the bearing surfaces 42 serve to strengthen and rigidify the top member against bending or buckling.

The top and platform members 10 and 12 are interengaged positively such that vertical loads applied to the upper surface of the top member 10 are transmitted directly to the mid-sections of the two load cells 16 and 18 without tipping, tilting, or shifting of the top member relative to the platform member. Referring now to FIG. 3, the platform member 12 includes two rectangularly outlined bosses 46 upstanding from the longitudinal edge portions of the platform member 12 and terminating in planar upper load bearing surfaces. An intermediate web portion 48 of generally rectangular outline is formed between and interconnects these bosses. The outlines of the top member bosses 44 substantially register the outline of the platform web portion 48 such that when the top and platform members 10 and 12 are superimposedly secured together, as depicted in FIGS. 1 and 2, the top member bosses 44, the platform bosses 46 and the platform web portion 48 internest at close clearance while the platform and top member load bearing surfaces are positively interengaged in face-to-face overlapped relationship. Thus, loads applied by the vehicle wheel to the top member upper surfaces 35 are transmitted simultaneously to the platform bosses 46. The top and platform members are secured to one another by four bolts 49 (FIG. 1) extending downwardly through holes 49a in the top member 10 and interengaged with holes 49b formed in the platform bosses 46.

The load cells 16 and 18 each include an elongated beam. These beams are formed by the longitudinal edge portions of the platform member 12. Viewed cross-sectionally in FIG. 3, each of the load cell bending beams is made up of two mutually opposed end sections 50, a mid-section 52 and two intervening sections 54 of reduced thickness. Their mid-sections are formed by the platform bosses 46. Their intervening sections are formed by two generally U-shaped upper recesses 55 in the upper surface of the platform member 12 adjacent the ends thereof. As most clearly shown in FIG. 4, the bending beam end sections 50 terminate in flat inter-connected foot portions 56 which are fixedly secured to the pad bottom member 14 by screws 58, or by welding, if desired. The lower surface of the platform member 14 is formed with an inverted U-shaped recess 59 so disposed that the platform foot portions 56 elevate the lower surfaces of the bending beam mid-sections 52 above the upper surface of the pad bottom member 14 when the top and platform members are interengaged as shown (FIG. 2).

Consequently, the bending beam mid-sections 52 of the two pad load cells are deflectable downwardly substantially simultaneously by downwardly directed loads applied by the vehicle wheels to the top member upper surface 35 and transmitted to the bending beam mid-sections 52. The platform web portion 48 serves to equalize loads applied to the load cells. Preferably it is of sufficient thickness to transfer load between the load cells, or to eliminate or minimize tortional or transverse strains on the pad. While preferably two transversely spaced apart load cells 16 and 18 made up of two bending beams adjacent opposite sides of the pad are used, one load cell made up of one centrally disposed bending beam of twice the surface area of the illustrated beams may be used, if desired.

Inasmuch as the bending beam end sections 50 are fixed, downward deflection of the bending beam mid-sections 52 cause their intervening sections 54 to be bent in ogee or S-curves. In these bent configurations, opposite portions of the upper surfaces of their intervening sections 54 are simultaneously strained oppositely: the portion adjacent the end sections 50 being extended or stretched while simultaneously therewith the portion adjacent the mid-sections 52 is contracted or compressed. Four pairs of electrical strain gages are secured to the upper surface of the bending beam intervening sections 54 adjacent the four corners of the platform member 12 and parallel to the longitudinal axis of the pad. Each strain gage pair comprises a tension sensing strain gage 58 and a compression sensing strain gage 60 respectively secured to sense changes in length in the oppositely strained portions of the upper surface of the bending beam intervening sections 54. That is, the tension sensing strain gages 58 are positioned adjacent the bending beam end sections 50 and the compression strain gages are positioned adjacent the bending beam mid-sections 52. The strain gages, of course, may be secured to the lower surface of the bending beam intervening sections. In this case, the bending beam intervening sections are formed by inverted U-shaped recesses in the bottom surface of the platform member and the polarity of the strain gages are reversed.

Conventional electrical resistance-wire strain gages may be used in the present invention. Such strain gages are connected in a four-arm Wheatstone Bridge Circuit by electrical connections provided by the upper printed circuit board 19a (FIG. 4). The strain gages are electrically connected to this printed circuit card by wires 64 from each strain gage, terminal strips 62 mounted on the upper surface of the bending beam intervening sections 54 between each pair of strain gages and electrical leads 65 extending through the body of the platform member 12.

Referring now in particular to FIG. 5, the Wheatstone Bridge and control circuitry of the weight sensing pad of this invention will now be described. The Wheatstone Bridge circuit is a four arm bridge comprising two half bridges A and B interconnected at the bridge inputs to which D.C. exitation voltage is applied by a power source in the indicator 9 (FIG. 6). A.C. exitation voltage, of course, may be used, if desired. Each half bridge includes two arms which are interconnected at one bridge zero point or output. The two half bridges are respectively made up of the strain gages associated with opposite ends of the pad. That is, half bridge A represents the one end of the pad and half bridge B represents the other end of the pad. The tension and compression sensing strain gages, respectively, are arranged in opposite arms of the bridge.

It will be recognized that the bridge circuit of FIG. 5 self-compensates for effects of temperature, longitudinal strain, and torsional strain because all four arms of the bridge include generally similar electrical elements oriented in the same general direction.

The control circuitry provided by printed circuit card 19b includes a bridge sensitivity adjustment circuit 104 respectively connected with the zero points or output of half bridges A and B by leads 100 and 102. The bridge sensitivity adjustment circuit 104 is used to trim each half bridge to the same sensitivity without altering the voltages at the zero points thereof. Once trimmed to the same sensitivity, it does not matter which load cell or end of the pad receives the major load and, hence, uneven or non-uniform load distribution upon the pad as may occur, for example, by positioning the vehicle wheel off center nearer one end of the pad or the other does not affect accuracy of the weight readings obtained.

In most practical cases it is desirable to trim the opposite ends of the pad relative to each other because it is the longitudinal direction that load variations due to wheel placement are most likely to occur. Wide treaded truck tires balloon outwardly and thus are not likely to impose transverse load variations on the pad. Hence, the half bridges A and B preferably are made up of strain gages respectively associated with opposite ends of the pad; however, they may be made up of strain gages associated with the sides of the pad, if desired. Two parallel bridges including one active gage per arm, of course, may be used, if desired.

Leads 100 and 102 are connected with the two inputs of a differential amplifier 106 which produces an output potential according to the differential unbalance in the bridge caused by changes in load upon the load cells. A zero adjustment circuit 108 is connected with lead 100 to adjust up or down the input potential from half bridge A until the output from the differential amplifier 106 is zero at no load upon the load cells.

The output of the differential amplifier 106 is connected by electrical lead 110 to a buffer amplifier 112 which in turn is connected by lead 114 to one input of a summing amplifier 116. A pad output adjustment circuit 118 is connected with lead 110. This circuit can be used to provide an output potential in lead 110 corresponding to a predetermined load upon the load cells so as to adjust the pad output sensitivity. A screw 120 accessible through the third platform passage 34 (FIGS. 3 and 4) may be used to operate the pad adjustment circuit 118 until a desired pad sensitivity is obtained. Thus, pads having standardized output sensitivities may be fabricated and interchanged with other pads already in the field without further adjustments. The buffer amplifier 112 is of high input impedance and constant low output impedance and serves to isolate the effects of resistance changes in the pad output adjustment circuit 118 from the summing amplifier.

Input electrical lead 122 from the preceeding pad in the series is connected with the other input to the summing amplifier 116, the output of which is connected with the weight indicator or meter 9 (not shown in FIG. 5). Gain control circuit 124 connected with input lead 122 is provided to increase the gain of such other pad inputs at the summing amplifier 116 to compensate for voltage drop in leads 2A, 4A, 6A, and 8A (FIG. 6); and hence compensates for loss in pad sensitivity. If only one pad is used, of course, or if the pad illustrated is the first in a series of pads, the output from the differential amplifier 106 is transmitted to the indicator 9, or to the pad output lead 2A without combination with additional signals from preceeding pads.

The indicator 9 includes a power source for bridge exitation, an analog to digital converter and a digital display. The pad output sensitivity is adjustable by the pad output adjustment circuit 118 to correspond to a given indicator input sensitivity or scale factor. For example, if a certain indicator input voltage potential corresponds to a scale reading of 10,000 pounds, the pad output adjustment circuit 118 is operated to produce the same voltage potential when a load of 10,000 pounds is applied to the pad. The indicator 9 also provides a reference voltage signal to all pads. All pad output potentials are referenced to this reference voltage.

To calibrate the pad, the control circuit of this invention may include a calibration circuit 126. Calibration circuit 126 includes a fixed precision resistor (not shown) and a calibration switch (also not shown) for connecting the resistor in parallel with one arm of the bridge. The pad is first loaded to a predetermined test weight and the output circuit adjustment screw 120 operated to adjust the pad output signal until a certain signal is obtained. The pad then is unloaded and the calibration switch closed to connect the resistor in parallel with one arm of the bridge. This resistor upsets the balance of the bridge a certain amount. The pad output signal obtained in this unbalanced condition of the bridge is then assigned to the pad as its calibration number which can be repeated during actual use to verify system calibration.

The pad top, platform and intermediate members 10, 12 and 14 are formed as monolithic members, preferably of a light weight metal such as aluminum. While preferably they are machined to their desired shapes, they may be cast, if desired. For ease in positioning the vehicle wheel on the top of the pad, the pad top and platform members may include oppositely inclined end faces 128 (FIG. 1) over which the vehicle wheel can be rolled. These faces substantially coincide with one another when the two members are interengaged, as depicted in FIG. 2. To reduce the weight of the pad, portions of the top and platform members may be cut away. For example, the platform member may include weight reduction cavities 136 (FIG. 3) formed in the platform bosses 46, intermediate cavities 138 formed adjacent the ends of the platform web portion 48, and end cavities 140 (FIG. 4) formed in the platform foot portions. Similarly, the top member 10 may include weight reduction cavities 142 (FIG. 4) in the underside thereof. Preferably none of these cavities extends completely through the top or platform members so that moisture and contaminants are isolated from the strain gages and terminal strips. For more effective protection of these elements, the space between the top and platform members 10 and 12 may be filled with a suitable sealing or potting material 144 (FIGS. 1 and 2).

While the preferred embodiment of this invention has been illustrated and described herein, it will be apparent that variations will become apparent to one skilled in the art. Accordingly, the invention is not to be limited to the specific embodiment illustrated and described herein and the true scope and spirit of the invention is to be determined by reference to the appended claims.

What is claimed is:

1. A weight sensing pad for sensing the weight of a vehicle transmitted by one wheel of the vehicle, comprising: first and second elongated bending beams spaced apart from each other in substantially parallel relationship, each of said beams having two ends and a midsection, means fixedly securing the ends of said bending beams such that their midsections can deflect upon application of downward load to their midsections, first and second strain sensing means associated, respectively, with said first and second bending beams providing electrical signals proportional to loads applied to each of said bending beam midsections, web means interconnecting said first and second bending beams for transferring load therebetween, and plate means positionable in load-bearing contact with the one wheel of the vehicle for transferring load applied to said plate means by said wheel to said bending beam midsections, said plate means being secured to and extending between said first and second bending beam midsections such that they are deflected downwardly substantially simultaneously when downward load is applied to said plate means by the one wheel of the vehicle.

2. The weight sensing pad of claim 1 wherein said first-mentioned and second bending beams each include intervening sections of reduced thickness between their respective midsections and ends, said intervening sections being so constructed and arranged that opposite portions of one surface thereof are strained oppositely in response to deflection of their respectively associated mid-sections.

3. The weight sensing pad of claim 2, wherein said first-mentioned and second strain sensing means each comprises two pair of electrical resistance strain gages respectively secured to oppositely strained portions of the surfaces of said intervening sections, and means electrically connecting said gages in a four arm wheatstone bridge circuit having two inputs at which excitation voltage is applied and two outputs, two of the arms of said bridge interconnected at one bridge output including strain gages associated with two opposed intervening sections of the first-mentioned and second bending beams, and the other two arms of said bridge interconnected at the other bridge output including strain gages associated with the other two opposed intervening sections of the first-mentioned and second bending beams.

4. The weight sensing pad of claim 3 further comprising means connected with the bridge outputs for relatively adjusting the sensitivities of said two arms and said other two arms such that the electrical signals provided at the outputs of said bridge are substantially independent of the disposition of applied load upon said plate means.

5. The weight sensing pad of claim 3 further comprising calibration means for selectively unbalancing said bridge, said calibration means including a resistor and means selectively connecting said resistor in parallel with one arm of said bridge.

6. The weight sensing pad of claim 3 further comprising differential amplifier means connected with the outputs of said bridge for providing an output potential signal indicative of load applied to said plate means, zero adjustment means for varying the potential at one of the bridge outputs such that said output potential signal indicates no applied load when no load is being applied to said plate means, and output adjustment means for varying said output potential signal such that it corresponds to load applied to said plate means.

7. The weight sensing pad of claim 6 further comprising summing amplifier means having two inputs one of which is connected with the output of said differential amplifier means, and high impedance buffer amplifier means connected between said differential and summing amplifier means for electrically isolating said output adjustment means from said summing amplifier means.

8. A weight sensing pad comprising: three superimposedly interengaged generally flat members, the intermediate of which provides two spaced apart load cells, each load cell including an elongated bending beam having two ends and a midsection, the lower of said three members being fixedly secured to the ends of said two bending beams such that their mid-sections can deflect upon application of downward loads to their mid-sections, and strain sensing means secured to said bending beams for providing electrical signals proportional to loads applied to their mid-sections, the upper and intermediate of said three members being interengaged such that downward loads applied to the upper of said three members are transmitted to the mid-sections of said two bending beams such that they are deflected downwardly substantially simultaneously.

9. The weight sensing pad of claim 8 further comprising means for trimming said strain sensing means such that their electrical signals are provided substantially independently of the disposition of such downward load upon the upper of said three members between the ends thereof.

10. The weight sensing pad of claim 9 further comprising amplifier means for amplifying said electrical signals.

11. A weighing system for sensing the weight of a vehicle transmitted by one wheel of the vehicle, comprising: a quadrilaterally outlined weight sensing pad having two ends and positionable underneath the one wheel in load-bearing contact therewith; the pad including fixed end band means having four bendable portions, two of which are adjacent one end of the pad, and the other two of which are adjacent the other end of the pad; electrical strain gauges respectively secured to said bendable portions; connecting means mounted in the pad for electrically connecting the strain gauges in a wheatstone bridge circuit having four arms, two of which include strain gauges associated with the one end of the pad and interconnected at one bridge output, and the other two of which include strain gauges associated with the other end of the pad and interconnected at the other bridge output; and amplifier means protectively mounted in a recess in the pad intermediate said end beam means and electrically connected with said bridge circuit outputs providing output signals indicative of load applied to the pad by the one wheel.

12. The weighing system of claim 11 wherein said amplifier means further comprises means connected with said bridge circuit outputs for trimming said bridge circuit such that said output signals are substantially independent of the position of the one wheel relative to the ends of the pad.

* * * * *